United States Patent
Bangalore et al.

(10) Patent No.: US 10,853,420 B2
(45) Date of Patent: *Dec. 1, 2020

(54) USER PROFILE AND ITS LOCATION IN A CLUSTERED PROFILE LANDSCAPE

(71) Applicant: AT&T INTELLECTUAL PROPERTY I, L.P., Atlanta, GA (US)

(72) Inventors: Srinivas Bangalore, Morristown, NJ (US); Junlan Feng, Basking Ridge, NJ (US); Michael J. Johnston, New York, NY (US); Taniya Mishra, New York, NY (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 646 days.

This patent is subject to a terminal disclaimer.

(21) Appl. No.: 15/681,741

(22) Filed: Aug. 21, 2017

(65) Prior Publication Data

US 2017/0344665 A1 Nov. 30, 2017

Related U.S. Application Data

(63) Continuation of application No. 12/901,075, filed on Oct. 8, 2010, now Pat. No. 9,767,221.

(51) Int. Cl.
| | |
|---|---|
| *G06F 16/00* | (2019.01) |
| *G06F 16/9032* | (2019.01) |
| *G06F 16/23* | (2019.01) |
| *G06F 16/907* | (2019.01) |

(52) U.S. Cl.
CPC ........ *G06F 16/90332* (2019.01); *G06F 16/23* (2019.01); *G06F 16/907* (2019.01)

(58) Field of Classification Search
CPC ... G06F 16/23; G06F 16/90332; G06F 16/907
See application file for complete search history.

(56) References Cited

U.S. PATENT DOCUMENTS

| | | | |
|---|---|---|---|
| 5,754,939 A | 5/1998 | Herz et al. | |
| 6,871,186 B1 | 3/2005 | Tuzhilin et al. | |
| 7,103,165 B2 | 9/2006 | Baniak et al. | |
| 7,487,095 B2 | 2/2009 | Hill et al. | |
| 8,224,773 B2* | 7/2012 | Spiegel | G06Q 30/02 |
| | | | 707/609 |
| 9,235,848 B1* | 1/2016 | Gourley | G06Q 30/0209 |
| 2001/0048738 A1 | 12/2001 | Baniak et al. | |
| 2004/0054572 A1* | 3/2004 | Oldale | G06F 16/337 |
| | | | 706/1 |
| 2005/0209907 A1 | 9/2005 | Williams | |
| 2006/0064411 A1 | 3/2006 | Gross et al. | |

(Continued)

*Primary Examiner* — Shew Fen Lin
(74) *Attorney, Agent, or Firm* — Amin, Turocy & Watson, LLP

(57) ABSTRACT

Extracting, from user activity data, quantitative attributes and qualitative attributes collected for users having user profiles. The quantitative attributes and the qualitative attributes are extracted during a specified time period determined before the user activity data is collected. Values for the quantitative attributes and the qualitative attributes are plotted, and subsets of the user profiles are clustered into separate group of users based on the plotted values. Delivering a product related content to the groups of users based on the clustering.

20 Claims, 7 Drawing Sheets

(56) References Cited

U.S. PATENT DOCUMENTS

| | | |
|---|---|---|
| 2007/0047714 A1 | 3/2007 | Baniak et al. |
| 2007/0208569 A1 | 9/2007 | Subramanian et al. |
| 2007/0260624 A1 | 11/2007 | Chung et al. |
| 2009/0063537 A1 | 3/2009 | Bonnefoy-Cudraz et al. |
| 2009/0307049 A1* | 12/2009 | Elliott, Jr. .......... G06Q 30/0201 |
| | | 705/7.29 |
| 2010/0094878 A1 | 4/2010 | Soroca et al. |
| 2010/0100827 A1 | 4/2010 | Hawthorne et al. |
| 2010/0169343 A1* | 7/2010 | Kenedy ................ G06F 16/285 |
| | | 707/758 |
| 2011/0029515 A1 | 2/2011 | Scholz et al. |
| 2011/0082752 A1 | 4/2011 | Dube et al. |
| 2011/0082824 A1* | 4/2011 | Allison ................ G06Q 10/063 |
| | | 706/20 |
| 2011/0131144 A1* | 6/2011 | Ashour ................ G06Q 10/10 |
| | | 705/319 |
| 2011/0282661 A1* | 11/2011 | Dobry .................... G10L 17/02 |
| | | 704/231 |
| 2012/0066065 A1* | 3/2012 | Switzer ................ G06Q 20/10 |
| | | 705/14.53 |
| 2015/0154648 A1* | 6/2015 | Tuzhilin .............. G06Q 30/018 |
| | | 705/14.53 |

\* cited by examiner

| | Average Purchase Amount [A] | Average Cost of Item [B] | Time Between Purchases [C] | Location Coordinates [D] | Navigation Behavior [E] | Reviews Read [F] | Questions Asked [G] | Previous Purchases [H] | Voice Analysis [I] |
|---|---|---|---|---|---|---|---|---|---|
| User1 | 500 | 15 | 9 months | (110, 101) | amazon.com | Social Media Social Media | Product Issue Product Oper. | Camera AT&T Iphone | Happy Happy |
| User2 | 1200 | 150 | 18 days | (110, 100) | saks.com google.com | Entity Site News Site | Returns Warranty | Furniture Clothing | Angry Frustrated |
| User3 | 20,000 | 75 | 3 months | (250, 145) | amazon.com | Social Media Social Media | Discount Product Oper. | Camera Camera Acc. | Curious Happy |
| User4 | 300 | 28 | 4 months | (35, 35) | target.com google.com | Social Media Social Media | Discount Warranty | Infant Items Home Elec. | Concerned Concerned |
| User5 | 4500 | 450 | 3 months | (35, 55) | bestbuy.com newegg.com | Entity Site QA Community | Product Issue Product Operat | None | Frustrated Concerned |
| User6 | 58 | 58 | N/A | (35, 55) | google.com bing.com | None | None | None | None |
| User7 | 8900 | 56 | N/A | (400, 340) | google.com bing.com | None | Returns Warranty | Home Elec. Car Elec. | Irritated Puzzled |
| User8 | 45 | 45 | 7 months | (35,35) | target.com bestbuy.com | None | None | None | Apathetic Apathetic |
| User9 | 900 | 300 | 1 year | (300, 35) | target.com bestbuy.com | Entity Site QA Community | Warranty Returns | Home Elec. West Elm Furnish | Apathetic Angry |
| User10 | 890 | 20 | 4 months | (400, 340) | google.com bing.com | Entity Site QA Community | Returns Warranty | Home Elec. JVC Car Stereo | Apathetic Angry |
| User11 | 300 | 100 | 6 months | (35, 55) | target.com google.com | Social Media Social Media | Discount Warranty | Infant Items Home Elec. | Concerned Irritated |

FIGURE 4

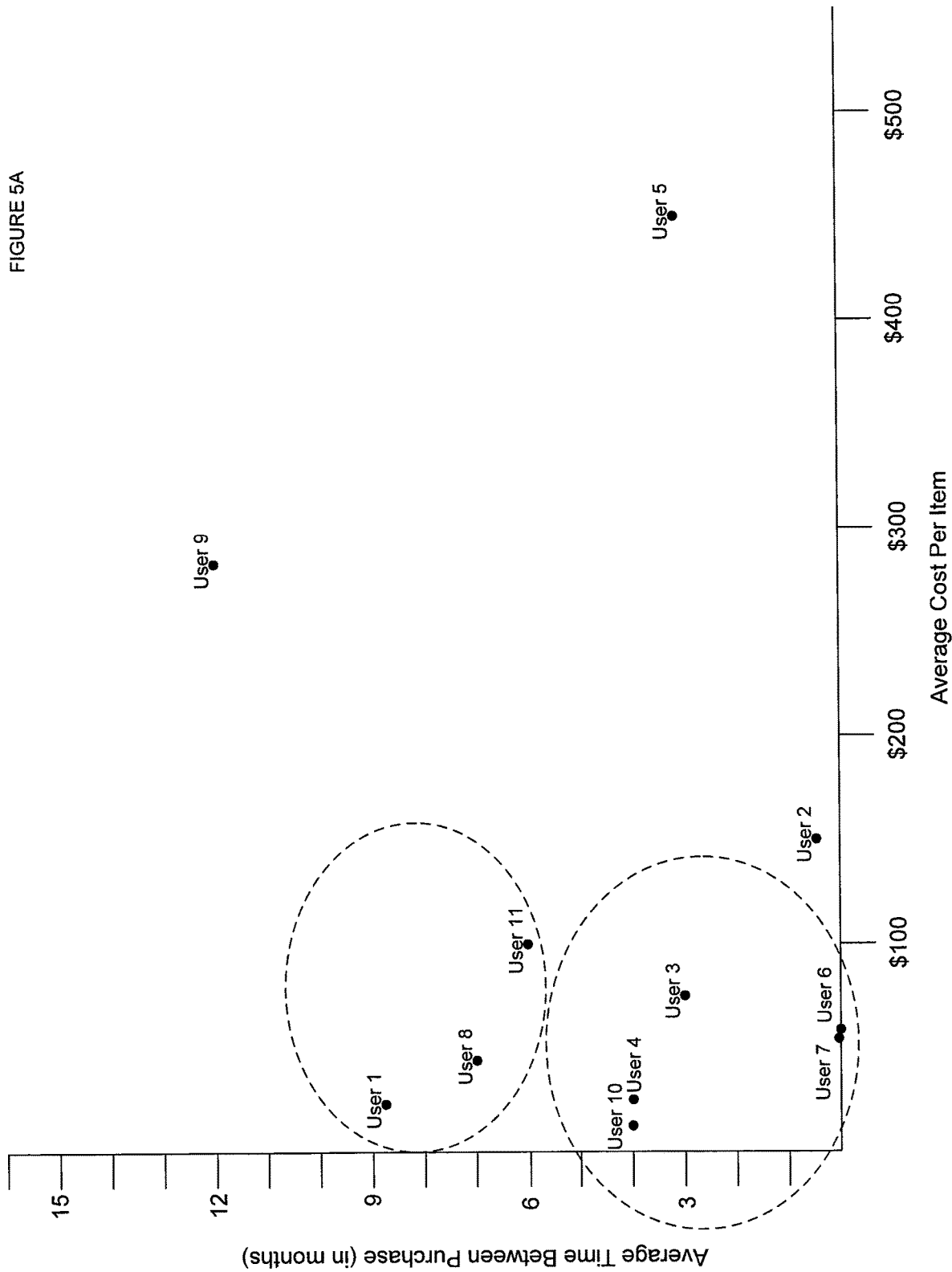

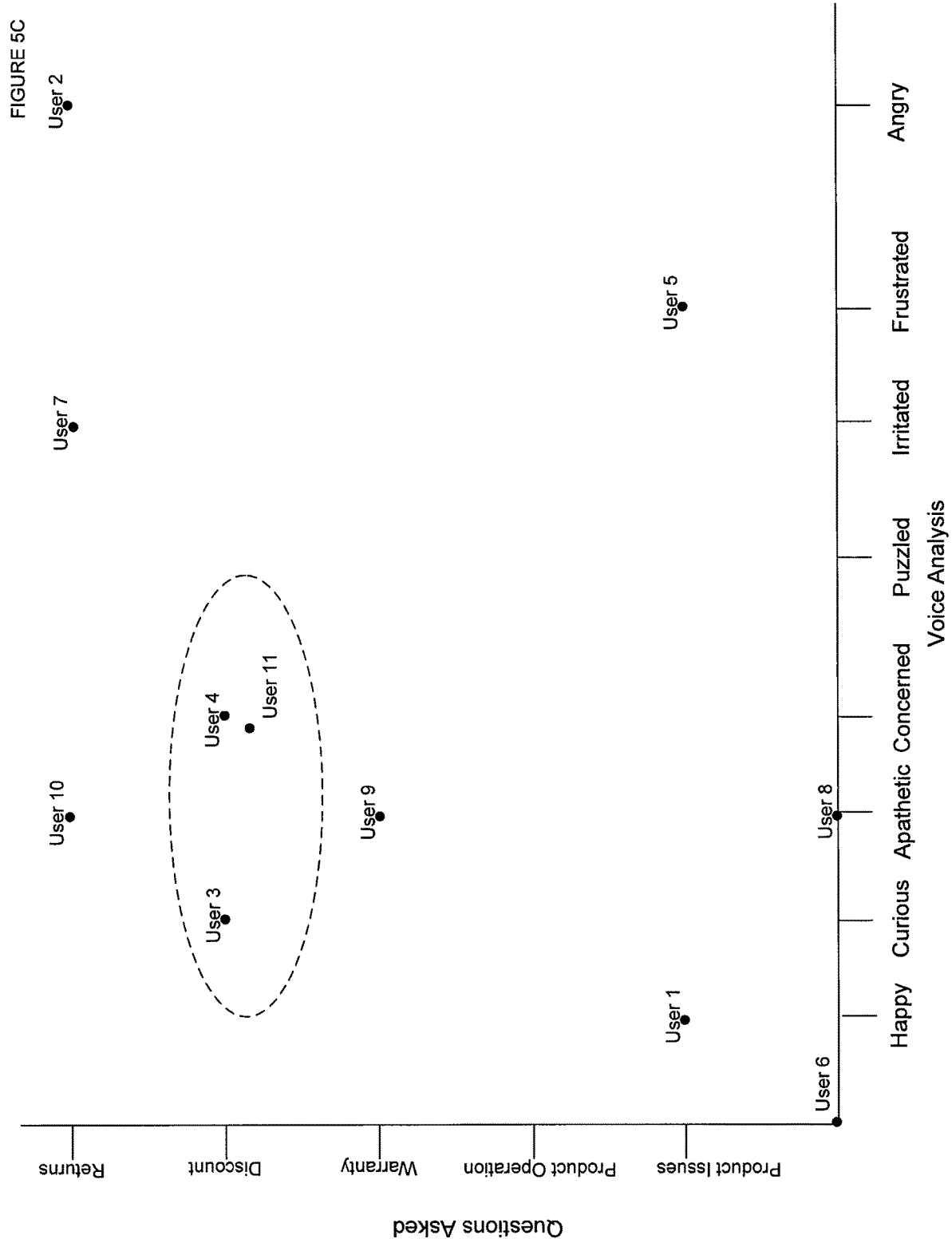

USER PROFILE AND ITS LOCATION IN A CLUSTERED PROFILE LANDSCAPE

This application is a continuation application of U.S. application Ser. No. 12/901,075, filed Oct. 8, 2010, the contents of which are expressly incorporated by reference herein in their entireties.

BACKGROUND

1. Field of the Disclosure

The present disclosure relates to collecting and storing user activity data in user profiles. More particularly, the present disclosure relates to delivering targeted content based on clustered user profiles.

2. Background Information

Consumers may shop at websites and brick-and-mortar stores to purchase products and services. The consumers may choose to frequent stores or websites maintained by certain entities more than stores or websites maintained by other entities. For example, consumers may select certain entities because their parents shopped with the selected entities, because the selected entities provide better deals and discounts, for convenience-related reasons or because of the payment method accepted by the selected entities.

When consumers shop at the selected entities, the consumers may receive paper advertisements at their residences and electronic advertisements at an email address. Sometimes, the consumers will buy the items advertised in the advertisements, and sometimes the consumers will choose not to buy the advertised items. The consumers may choose not to buy the advertised items because the advertised items may be too expensive, of undesirable quality, or may not be compatible with the consumers' likes and dislikes. Each consumer may have a unique reason for not purchasing an advertised item.

BRIEF DESCRIPTION OF THE DRAWINGS

FIG. 4 shows an exemplary set of user profiles specifying values for qualitative and quantitative attributes, according to an aspect of the present disclosure;

FIG. 5A shows an exemplary graph plotting quantitative attributes as well as clusters determined therefrom, according to an aspect of the present disclosure;

FIG. 5C shows an exemplary graph plotting qualitative attributes as well as a cluster determined therefrom, according to an aspect of the present disclosure.

DETAILED DESCRIPTION

Figure 1:
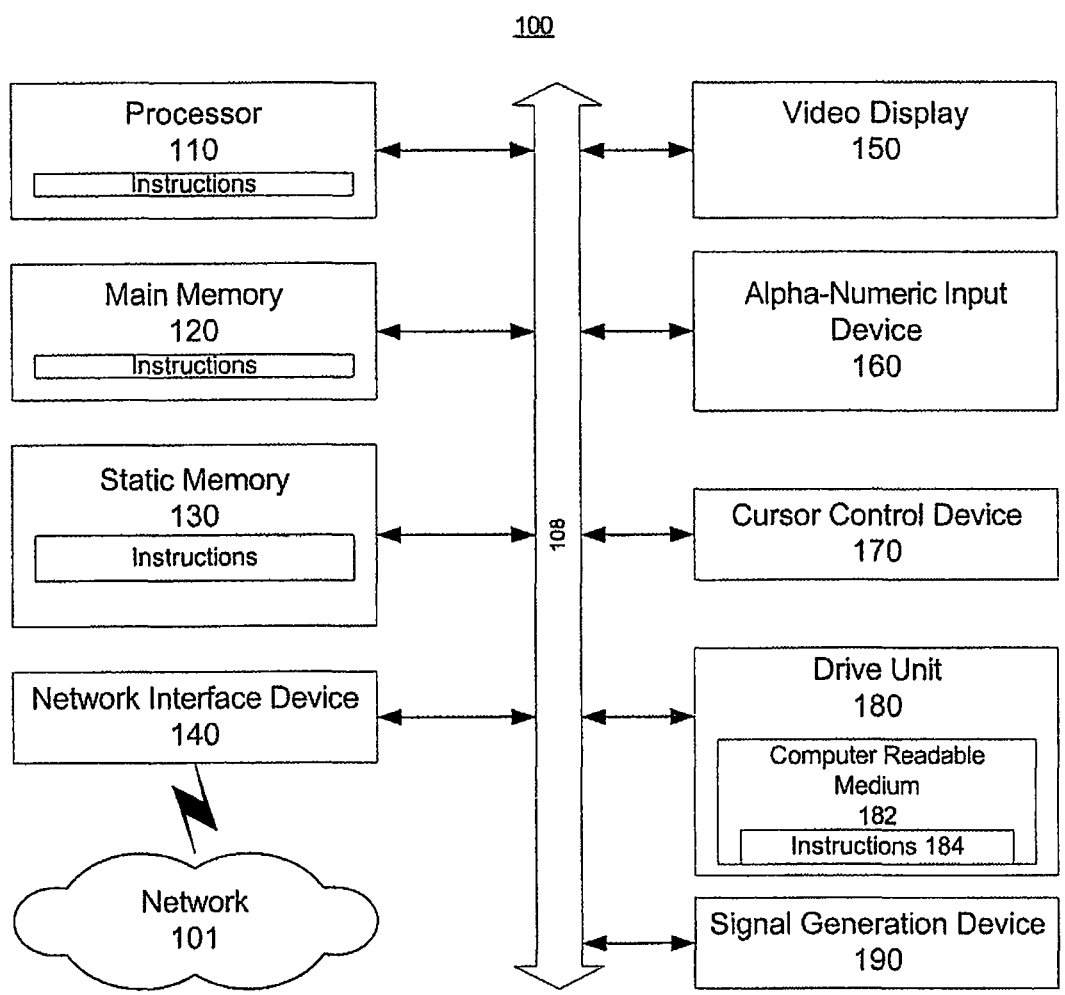
FIG. 1 shows an exemplary general computer system that includes a set of instructions for implementing clustering of user profiles and delivery of targeted content, as described herein.

In view of the foregoing, the present disclosure, through one or more of its various aspects, embodiments and/or specific features or sub-components, is thus intended to bring out one or more of the advantages as specifically noted below.

According to an aspect of the present disclosure, a method of delivering targeted content includes collecting, via at least one tangible processor, user activity data for users during a specified time period. The method includes extracting from the user activity data, via the at least one tangible processor, questions asked by the users during the specified time period and storing the questions asked in user profiles for the users. The method includes clustering, via the at least one tangible processor, the user profiles based on the questions asked. The method includes delivering, via the at least one tangible processor, targeted content to a subset of the users based on the clustering.

According to another aspect of the present disclosure, a subset of the user profiles are dynamic user profiles.

According to yet another aspect of the present disclosure, a subset of the user profiles are static user profiles.

According to still another aspect of the present disclosure, the user activity data includes details of purchasing items via an entity.

According to an aspect of the present disclosure, the method includes extracting from the user activity data, via the at least one tangible processor, speech characteristics based on a speech analysis of a portion of the user activity data and the clustering is further based on the speech characteristics.

According to another aspect of the present disclosure, the method includes extracting from the user activity data, via the at least one tangible processor, geolocation data for at least one user and the clustering is further based on the geolocation data.

According to yet another aspect of the present disclosure, the method includes extracting from the user activity data, via the at least one tangible processor, user activity data corresponding to similar users and the clustering is further based on the user activity data corresponding to similar users.

According to still another aspect of the present disclosure, the similar users are determined to be similar based on demographic information for the users stored in the user profiles.

According to an aspect of the present disclosure, the targeted content comprises at least one targeted recommendation.

According to another aspect of the present disclosure, the targeted content comprises at least one targeted answer.

According to yet another aspect of the present disclosure, the targeted content comprises content rendered according to display requirements for a user device.

According to still another aspect of the present disclosure, the targeted content is globally accessible by a plurality of entities.

According to an aspect of the present disclosure, the targeted content comprises at least one targeted advertisement.

According to another aspect of the present disclosure, the method includes storing demographic information, obtained from the speech analysis of the portion of the user activity data, in the user profiles.

According to yet another aspect of the present disclosure, the method includes storing at least one emotion for at least one of the users determined based on the speech analysis of the portion of the user activity data, in the user profiles.

According to still another aspect of the present disclosure, at least one of the user profiles is actively configured by at least one corresponding user.

According to an aspect of the present disclosure, the method includes determining, via the at least one tangible processor, a generalized prediction of future user activity based on at least one of: the clustering and at least one of the user profiles.

According to another aspect of the present disclosure, the method includes determining, via the at least one tangible processor, preferred websites for at least one of the users, based on the user activity data.

According to an aspect of the present disclosure, a system for delivering targeted content includes a collector that collects user activity data for users during a specified time period. The system includes an extractor that extracts, from the user activity data, questions asked by the users during the specified time period and stores the questions asked in user profiles for the users. The system includes a clusterer that clusters user profiles based on the questions asked. The system includes a presenter that delivers targeted content to a subset of the users based on the clustering.

According to an aspect of the present disclosure, at least one non-transitory computer readable medium stores a set of executable instructions for delivering targeted content, the set of executable instructions directing at least one processor to perform acts of: collecting user activity data for users during a specified time period. The set of executable instructions directing the at least one processor to extract, from the user activity data, questions asked by the users during the specified time period and storing the questions asked in user profiles for the users. The set of executable instructions directing the at least one processor to cluster the user profiles based on the questions asked. The set of executable instructions directing the at least one processor to deliver targeted content to a subset of the users based on the clustering.

According to a non-limiting embodiment of the present disclosure, users interact with selected entities in order to perform a number of transactions. The entities are any of the following, but not limited to: schools, organizations, retail companies, corporations, business-to-business companies, companies selling products and/or services, religious organizations, non-profit organizations, partnerships and governmental organizations. Exemplary entities include any of the following, but not limited to: utility companies (e.g., sewage, water, gas, electric, garbage removal, telephone), service offering companies (e.g., cable television providers, Internet service providers, satellite television providers, mobile phone service providers), home office supply companies, computer companies, insurance companies (e.g., life insurance, homeowners' insurance, dental insurance, vision insurance, pet insurance, medical insurance, malpractice insurance, liability insurance), clothing companies, automotive companies and universities.

The users interact with the selected entities via websites for the selected entities (e.g., http://www.att.com, http://www.nyu.edu, http://www.metlife.com), sometimes to conduct transactions. User interactions and user transactions include any of the following, but not limited to: purchasing items, selling items, inquiring about products and services, returning items and reviewing products and services. User activity data specifying the user interactions and the user transactions is collected. Specified details of user interactions and user transactions are extracted from the user activity data and stored in user profiles. Specified details include any of the following, but not limited to: speech analysis of the user activity data, questions asked by the users, geolocation data for the users. The user activity data is also used to determine user interactions and user transactions of one or more users that are similar to a selected user. In one non-limiting embodiment, similar user behavior is stored in the user profile. As will be discussed in further detail below, in one non-limiting embodiment, similar user behavior refers to user activity data for users that are similar to the selected user in terms of demographic information.

The user profiles are clustered based on values for qualitative and quantitative attributes specified in the user profiles. A subset of the user profiles determined to be "closest" or most similar to each other form a cluster. Targeted content is obtained for and developed for the cluster, based on the values specifying the qualitative and quantitative attributes stored in the user profiles. The targeted content is presented to the user via any of the following, but not limited to: a personal computing device (e.g., a notebook computer and a desktop personal computer) and a mobile device (e.g., data phone, cellular phone and Netbook).

FIG. 1 is an illustrative embodiment of a general computer system that includes a set of instructions for implementing a personal customer care agent as described herein. The general computer system is shown and is designated 100. The computer system 100 can include a set of instructions that can be executed to cause the computer system 100 to perform any one or more of the methods or computer based functions disclosed herein. The computer system 100 may operate as a standalone device or may be connected, for example, using a network 101, to other computer systems or peripheral devices. For example, the computer system 100 may include or be included within any one or more of the computers, servers, systems, or communication networks described herein.

In a networked deployment, the computer system may operate in the capacity of a server or as a client user computer in a server-client user network environment, or as a peer computer system in a peer-to-peer (or distributed) network environment. The computer system 100, or portions thereof, can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a personal trusted device, a web appliance, or any other machine capable of executing a set of instructions (sequential or otherwise) that specify actions to be taken by that machine. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 may include a processor 110, for example, a central processing unit (CPU), a graphics processing unit (GPU), or both. Moreover, the computer system 100 can include a main memory 120 and a static memory 130 that can communicate with each other via a bus 108. As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an alpha-numeric input device 160, such as a keyboard, another input device (not shown), such as a remote control device having a wireless keypad, a keyboard, a microphone coupled to a speech recognition engine, a camera such as a video camera or still camera, and a cursor control device 170, such as a mouse. The computer system 100 can also include a disk drive unit 180, a signal generation device 190, such as a speaker or remote control, and a network interface device 140.

In a particular embodiment, as depicted in FIG. 1, the disk drive unit 180 may include a computer-readable medium 182 in which one or more sets of instructions 184, e.g. software, can be embedded. A computer-readable medium 182 is a tangible article of manufacture, from which sets of instructions 184 can be read. Further, the instructions 184 may embody one or more of the methods or logic as described herein. In a particular embodiment, the instructions 184 may reside completely, or at least partially, within the main memory 120, the static memory 130, and/or within the processor 110 during execution by the computer system 100. The main memory 120 and the processor 110 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations, or combinations thereof.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium 182 that includes instructions 184 or receives and executes instructions 184 responsive to a propagated signal, so that a device connected to a network 101 can communicate voice, video or data over the network 101. Further, the instructions 184 may be transmitted or received over the network 101 via the network interface device 140.

Figure 2:
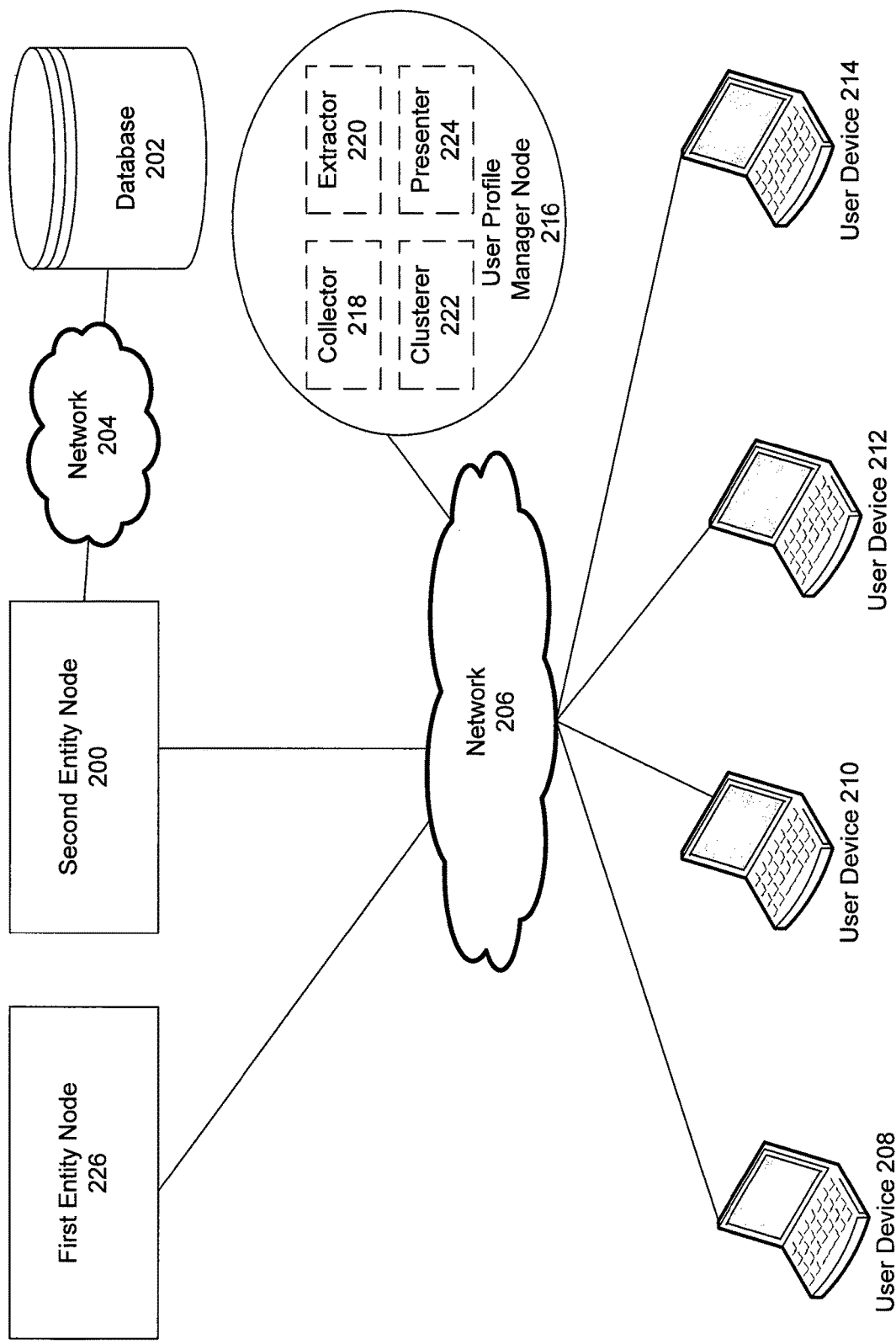
FIG. 2 shows an exemplary system including components for clustering user profiles and delivering targeted content, according to an aspect of the present disclosure.

In FIG. 2, an exemplary system including components for clustering user profiles is shown. First entity node 226 is owned, operated or maintained by or on behalf the entity. A node is any of the following, but not limited to: a processor, a network element, a server, a computing device, a database, a hardware device, a physical storage and a physical memory. While shown as a single node in FIG. 2, first entity node 226 is implementable on one or more nodes. Further, although first entity node 226 and second entity node 200 are illustrated in FIG. 2 as being two separate nodes, it is noted that the above-noted nodes are implementable on a single node. First entity node 216 and second entity node 200 are implemented by distinct entities. For example, a first entity corresponding to the first entity node 226 may be a clothing retailer and a second entity corresponding to the second entity node 200 may be a computer company. As will be understood by one of ordinary skill in the art, FIG. 2 illustrates nodes for two distinct entities; any finite number of nodes and any finite number of entities are within the scope and purview of the present disclosure.

First entity node 216 and second entity node 200 are connected to user device 200, user device 210, user device 212 and user device 214 via network 206. As will be understood by one of ordinary skill in the art, any number of users are connected to first entity node 226 and second entity node 200. The user device is any of the following, but not limited to: a personal computing device, a mobile device and a mobile computing device. It is understood that network 206 may be implemented by any telecommunications or data network(s) accessible by the user including, but not limited to: wide area networks (WANs), public switched telephone networks (PSTNs), asynchronous transfer mode (ATM) networks, and the Internet (using, for example, voice over internet protocol), without departing from the spirit and scope of the present disclosure. In one non-limiting embodiment of the present disclosure, network 206 includes component networks that are heterogeneous to one another. In another non-limiting embodiment of the present disclosure, each of the component networks are homogeneous with one another.

Either one or both of first entity node 226 and second entity node 200 are optionally connected to database 202 via network 204. In one non-limiting embodiment, first entity node 226 and database 202 are implemented together. In another non-limiting embodiment, second entity node 200 and database 202 are implemented together. As discussed above with respect to network 206, it is understood that network 204 may be implemented by any telecommunications or data network(s) accessible by the users including, but not limited to: wide area networks, public switched telephone networks, asynchronous transfer mode networks, and the Internet (using, for example, voice over internet protocol), without departing from the spirit and scope of the present disclosure.

As will be discussed in further detail below, in one non-limiting embodiment of the present disclosure, user activity data is collected and stored in user profiles by a third party distinct from the entity and the user. The third party also performs clustering operations on the user profiles. As shown in FIG. 2, user profile manager node 216 is connected to network 206. As will be understood by one of ordinary skill in the art, user profile manager node 216 is shown as a single node, but may be implemented by any number of nodes. In another non-limiting embodiment of the present disclosure, user activity data is collected and stored in user profiles by each entity with which the user interacts. The entity also performs clustering operations on the user profiles. User profile manager node 216 is implementable conjunction with the entity. That is, in one non-limiting embodiment of the present disclosure, user profile manager node 216 and either first entity node 226 and second entity node 200 are implementable as a single node. In yet another non-limiting embodiment of the present disclosure, user activity data is collected and stored in user profiles by user device of the user. The user device also performs clustering operations on the user profiles. User profile manager node 216 is implementable in conjunction with the user device. That is, in one non-limiting embodiment of the present disclosure, the user profile manager node 216 and the user device 208, 210, 212 or 214 are implementable as a single node.

User profile manager node 216 includes collector 218, extractor 220, clusterer 222 and presenter 224. Each of collector 218, extractor 220, clusterer 222 and presenter 224 are implementable using any combination of software and hardware that is implemented on the user profile manager node 216. In one exemplary, non-limiting embodiment of the present disclosure, the collector 218 is a software application that is implemented on a hardware portion of the user profile manager node 216, which is, for example, a database. In another exemplary, non-limiting embodiment of the present disclosure, the extractor 220 is implemented by operating system software and corresponding hardware upon which the operating system software acts, and the user profile manager node 216 includes a processor that has, for example, three different operating systems running thereon. In yet another exemplary, non-limiting embodiment of the present disclosure, the clusterer 222 uses only a portion of the hardware of the user profile manager node 216. In still another exemplary, non-limiting embodiment of the present disclosure, the hardware portion of the user profile manager node 216 is implemented by a network server and the presenter 224 uses a physical, hardware interface of the network server.

Figure 3:
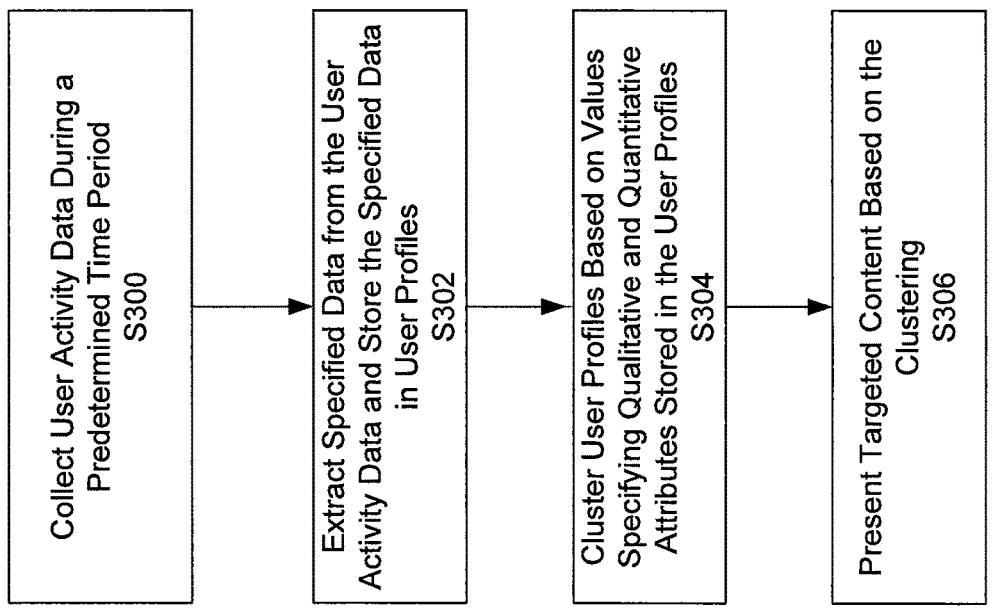
FIG. 3 shows an exemplary process flow diagram for clustering user profiles and delivering targeted content, according to an aspect of the present disclosure.
Figure 5B:
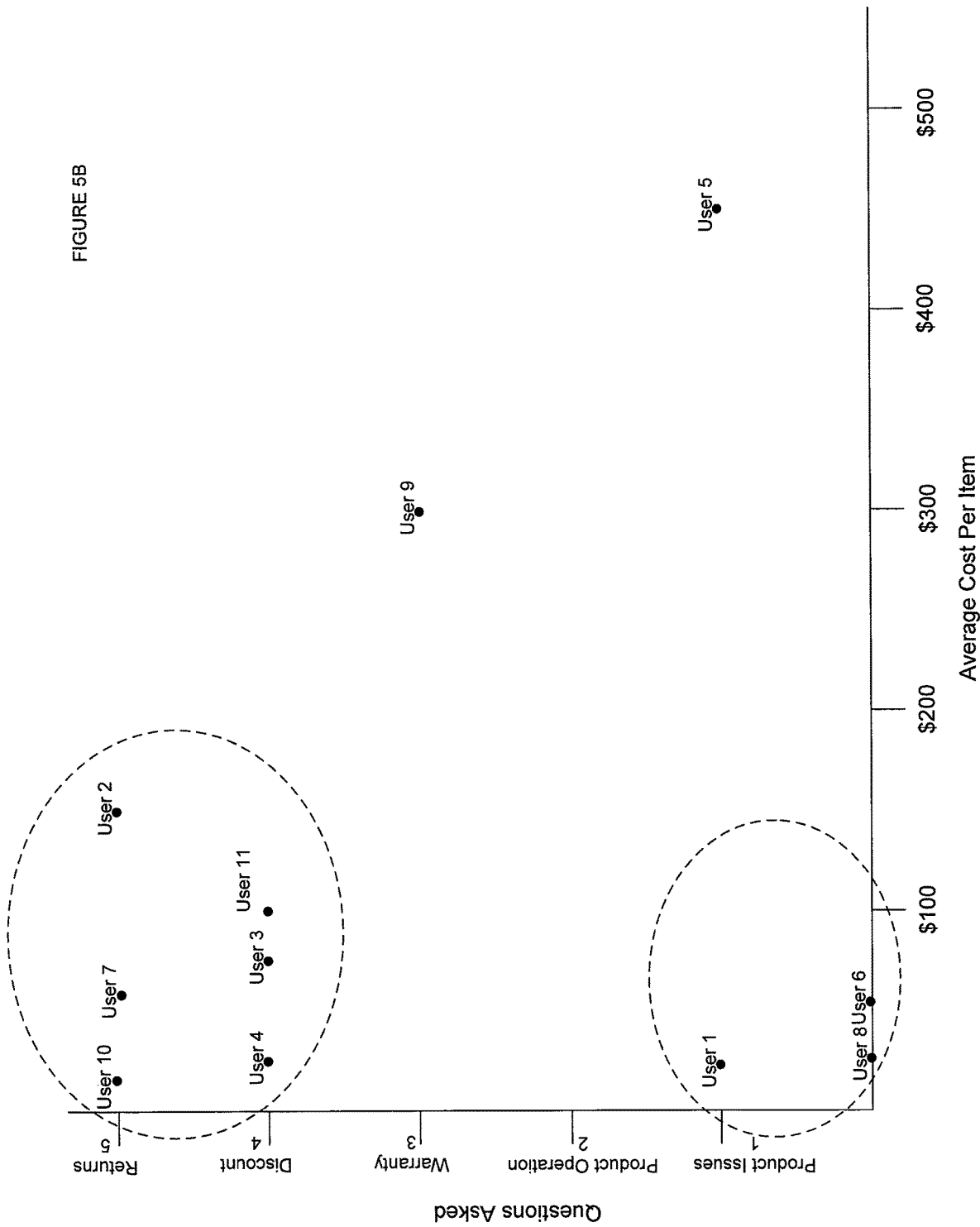
FIG. 5B shows an exemplary graph plotting qualitative and quantitative attributes as well as clusters determined therefrom, according to an aspect of the present disclosure.

The collector 218 collects user activity data for users operating user device 208, user device 210 and user device 212 and user device 214 during a specified time period, via network 206. The user activity data relates to user activity performed by users operating user device 208, user device 210, user device 212 and user device 214 with respect to first entity node 226 and second entity node 200. The extractor 220 extracts, from the user activity data, questions asked by the users operating user device during the specified time period and stores the questions asked in user profiles for the users. An exemplary user profile is shown in FIG. 4. The clusterer 222 clusters user profiles based on the questions asked as shown in FIGS. 5A through 5C. The presenter 224 delivers targeted content to a subset of the users operating user device 208, user device 210, user device 212 and user device 214 based on the clustering as illustrated in FIG. 3. In a non-limiting embodiment of the present disclosure, the presenter 224 sends the targeted content to the subset of the users operating user device 208, user device 210, user device 212 and user device 214 via the network 228.

In FIG. 3, an exemplary process flow diagram for clustering user profiles is shown. In step S300, user activity data specifying user interactions and user transactions between one or more users and one or more entities is collected during a specified time period. As will be understood by one of ordinary skill in the art, the predetermined time period is a period of minutes, hours, days, weeks, months or years. As discussed above, in one non-limiting embodiment of the present disclosure, a user device collects the user activity data. In another non-limiting embodiment of the present disclosure, a third party, i.e., user profile manager node 216 collects the user activity data. In yet another non-limiting embodiment, the entity collects details of the user activity. The user activity data specifies user interactions and user transactions and includes any of the following, but not limited to: time of user interactions and/or transactions, types of user interactions and/or transactions, user location during user interactions and/or transactions, demographic information for the user, user interaction and/or transaction details and navigation details.

In step S302, specified data is extracted from the user activity data. The specified data is selected and extracted by one or more of the third party, i.e., user profile manager node 216, the user and the entity. The specified data is any of the following, but not limited to: geolocation data for the user or the user device (i.e., user location during user interactions and/or transactions as noted above); questions asked by the user (i.e., user interaction and/or transaction details as noted above); interaction and/or transaction details stored by the entity that are unknown to the user (i.e., user interaction and/or transaction details as noted above); speech analysis data (i.e., user interaction and/or transaction details as noted above); and user activity corresponding to "similar" users. In one non-limiting embodiment of the present disclosure, similar users are have similar demographic information. In another non-limiting embodiment of the present disclosure, similar users ask similar questions, have similar interaction and/or transaction details, are located in geographic areas that are close to each other or have similar speech data. It is noted that similar users are defined based on similarities among corresponding qualitative or quantitative attributes specified in user profiles or based on similarities among user activity data for each of the similar users.

As will be understood by one of ordinary skill in the art, any number of types of user activity data, interaction details and transaction details may be extracted from the user activity data. For example, the time of user interactions and/or transactions (e.g., time of day, day of month, month of year), the types of user interactions and/or transactions (e.g., purchasing, inquiring, reviewing, commenting and returning transactions), demographic information (e.g., education level, household income, gender, ethnicity) for the user, and navigation details (e.g., websites navigated to before, during and after interacting with the entity website, a type of website navigated to) may be extracted from the user activity data. The extracted specified data is used to configure a user profile. In one non-limiting embodiment of the present disclosure, a portion of the user profile is configured manually by the user. For example, the user may choose to manually configure the user profile with the user's demographic information. In such case, the specified data is extracted from the user profile. In another non-limiting embodiment of the present disclosure, the user profile or a portion of the user profile is configured automatically.

In step S304, the user profiles for a number of users are clustered based on either or both qualitative and quantitative attributes specified in the user profiles. As discussed above, in one non-limiting embodiment of the present disclosure, values specifying the quantitative and qualitative attributes are extracted from the user activity data and stored in the user profiles. stored in the user profile is extracted from the user activity. Also as discussed above, in another non-limiting embodiment of the present disclosure, a subset of either or both the values specifying the quantitative and qualitative attributes includes information provided by the user. For example, quantitative attributes for clustering the user profiles include any of the following, but not limited to: a total amount spent during one shopping checkout, geolocation data, time period between purchases, time spent navigating an entity website and demographic information including age, socioeconomic status, highest education level, household income, gender and marital status. Qualitative attributes for clustering the user profiles include any of the following, but not limited to: types of items purchased, navigation behavior after purchasing items, questions asked before, during and after interacting with the entity, a level of stress detected from user voice data obtained from a telephone call with the user, a user emotion detected from words used by the user to indicate preferences or desires via voice input or data input. As will be understood by one of art, the values specifying the quantitative and qualitative attributes stored in the user profile relate to any information that is capturable by the entity, the third party or the user and any information indicateable by the user.

In one non-limiting embodiment, when the user profiles are to be clustered based on the qualitative attributes, the qualitative attributes are categorized and numerically specified. That is, each of the possible values for the qualitative attribute are given a numerical value based on a numerical scale. For example, if possible user emotions include: "very happy", "nonchalant", "frustrated", and "angry", the entity, the third party or the user may choose to apply the following numerical scale to the user emotions: "very happy=4", "nonchalant=3", "frustrated=2" and "angry=1".

By plotting the values for selected ones of qualitative and quantitative attributes obtained from user profiles, or by determining the "distance" between user profiles based on the selected qualitative or quantitative attributes, one or more subsets of user profiles are obtained. For example, if the user profiles are clustered based on a quantitative attribute specifying a dollar amount purchased, then the user profiles are clustered based on those users who spent a similar amount of money (i.e., all user profiles for users that spent between $500 and $600 are clustered in a subset). If user profiles are clustered based on a qualitative attribute specifying a level of satisfaction with a purchase, then a numerical value corresponding to "happy" and "satisfied" users will indicate a relatively short distance among the user profiles and user profiles corresponding to the "happy" and "satisfied" users will be clustered together in a single cluster. As will be understood by one of ordinary skill in the art, any number of qualitative and quantitative attributes are compared among two or more user profiles to determine a distance among the user profiles and to determine one or more clusters. For example, two or more quantitative attributes can be compared. As another example, three qualitative attributes and two quantitative attributes can be compared amongst each other. An example of clustering user profiles is shown in FIGS. 5A, 5B and 5C and is discussed in further detail below.

In step S306, based on the clustering, targeted content is obtained. Content is developed or obtained by the entity or the third party for the users corresponding to clustered user profiles. That is, user information, user activity data or other attributes stored in the user profiles are used to develop any of the following, but not limited to: advertisements, recommendations, answers and rendered displays of the content that are specific to user devices of the users corresponding to the clustered user profiles. For example, user profiles for eight users who spent an average of $500 to $600 on each purchase are clustered together. Advertisements for midrange electronics are presented to the exemplary cluster of users. As another example, user profiles for twelve users who are "happy" and "satisfied" are clustered together. Either the entity or the third party develops content, in the form of recommendations for underperforming and overstocked products. It may be assumed that insofar as the twelve users are "happy" and "satisfied" with their user interactions with the entity, they may be easier to please than other users and therefore, the entity or the third party may have a higher likelihood of being able to sell underperforming and overstocked products to these clustered twelve users.

In FIG. 4, an exemplary set of user profiles is shown. Each row in the illustrated table corresponds to a single user profile. Each user profile contains quantitative attributes including, an average dollar amount for each purchasing instance, an average cost of item, an average time period between purchases, and latitude and longitude location coordinates specifying a geographic location. As will be understood by one of ordinary skill in the art, the illustrated quantitative attributes are exemplary in nature and are not limited to the examples described herein. Each user profile also contains qualitative attributes including website navigation behavior, types of reviews read, questions asked, types of items previously purchased and types of emotions elicited during a voice analysis. As will also be understood by one of ordinary skill in the art, the illustrated qualitative attributes are exemplary in nature and are not limited to the examples described herein.

Further, the illustrated user profiles show two lines per user profile. As will be understood by one or ordinary skill in the art, the user profile is enabled to store a quantity of data limited by the collecting entity's resources. For example, each of the qualitative attributes shown for each user profile in FIG. 4 are specified by two or fewer values. Any number of values for the qualitative attributes of navigation behavior, reviews read, questions asked, previous purchases and speech analyses may be stored in the user profile. In one non-limiting embodiment, the user profile stores a predetermined number of values for each qualitative and quantitative attribute. In another non-limiting embodiment, the user profile stores a number of values corresponding to qualitative attributes and quantitative attributes collected during a specified time period.

Moreover, as will be understood by one of ordinary skill in the art, in one non-limiting embodiment shown in FIG. 4, the illustrated qualitative attributes of reviews read, questions asked and voice analysis correspond to values in each user profile that are categorized into a category of value. For example, User1 may have visited social media networking websites, e.g., Facebook™ and Twitter™. User2 may have visited an entity website, e.g., AT&T Wireless™ and a news organization website, e.g., The Washington Post™ website. For ease of comparison, these items are categorized into a type of website. That is, Facebook™ and Twitter™ are categorized into a social media category. The AT&T Wireless™ website is categorized into an entity site category. The AT&T Wireless™ website is categorized into the entity site category insofar as users may purchase products or services from the AT&T entity via the AT&T Wireless™ website. The Washington Post™ website is categorized into a news site category.

In FIG. 4, the values corresponding to questions asked are categorized into product issue, product operation, return, warranty and discount categories. The values corresponding to emotions elicited from voice analysis are categorized into happy, angry, frustrated, concerned, irritated, puzzled and apathetic. In another non-limiting embodiment, the values corresponding to the qualitative attributes are not categorized. For example, values corresponding to the previous purchases qualitative attribute shown in FIG. 4 are not categorized into categories.

The values specifying the qualitative and quantitative attributes shown in FIG. 4 are used to cluster user profiles for User1 through User11. In FIG. 5A, an exemplary graph showing clusters determined by plotting quantitative attributes of the user profiles (i.e., average time between purchases and average cost per item) is shown. As will be understood by one of ordinary skill in the art, more than two user profile attributes may be used to determine a cluster. In the example shown in FIG. 5A, two user profile attributes are clustered to present a two-dimensional graph. In FIG. 5A, a first cluster clustering user profiles for User1, User8 and User 11 and a second cluster clustering user profiles for User3, User4, User6, User7 and User10 are shown. As will be understood by one of ordinary skill in the art, the illustrated clusters are exemplary and a different clustering of user profiles may be selected by the entity that clusters the user profiles (i.e., the entity, the third party or the user device). For example, in another non-limiting embodiment, User2, User3, User6 and User7 could be clustered into a single cluster, User4 and User10 could be clustered into a single cluster, and User1, User8 and User11 could be clustered into a single cluster. As will be understood by one of ordinary skill in the art, any metric may be applied in determining which user profiles to include in a single cluster.

In FIG. 5B, an exemplary graph showing clusters determined by plotting quantitative and qualitative attributes of the user profiles (i.e., questions asked and average cost per item) is shown. In one non-limiting embodiment of the present disclosure, qualitative attributes are categorized and each category is represented by a numerical value. As shown in FIG. 5B, the qualitative attributes including product issues corresponds to a numerical value of "1", product operation corresponds to a numerical value of "2", warranty corresponds to a numerical value of "3", discount corresponds to a numerical value of "4" and returns corresponds to a numerical value of "5". As will be understood by one of ordinary skill in the art, the numerical value of each category of questions asked is configurable by one or more of the third party, the entity and the user. In FIG. 5B, two exemplary clusters are shown; a first cluster including User2, User3, User4, User7, User10 and User11 as well as a second cluster including User1, User6 and User8. As will be understood by one of ordinary skill in the art, any number of clusters are determined encompassing any number of users based on a distance metric chosen by one or more of the third party, the entity and the user.

In FIG. 5C, an exemplary graph showing clusters determined by plotting qualitative attributes of the user profiles (i.e., questions asked and voice analysis) is shown. As discussed previously with respect to FIG. 5B, the qualitative attributes including product issues corresponds to a numerical value of "1", product operation corresponds to a numerical value of "2", warranty corresponds to a numerical value of "3", discount corresponds to a numerical value of "4" and returns corresponds to a numerical value of "5". The qualitative attribute of voice analysis that specify emotions including "happy", "curious", "apathetic", "concerned", "puzzled", "irritated", "frustrated" and "angry" are not specified by a numerical value. A single cluster including User3, User4, and User11 based on the above-noted distance metric.

Based on the clusters shown in FIGS. 5A, 5B and 5C, targeted content is obtained and developed for each user corresponding to the user profiles in a single cluster. The targeted content is either obtained from one or more qualitative or quantitative attributes stored in one or more user profiles included in the cluster, or is developed based on generalized behavior of users corresponding to user profiles included in the cluster. Targeted content includes any of the following, but not limited to: targeted advertisements, targeted answers, a targeted answer style, targeted content rendition, targeted recommendations, a targeted style of content and other targeted content. In one non-limiting embodiment of the present disclosure, one or more user profiles are globally accessible by one or more entities, in addition to the party collecting the user activity data and configuring the user profiles (i.e., one or more of the third party, the entity and the user). In another non-limiting embodiment of the present disclosure, a subset of the obtained or developed targeted content is globally accessible by one or more entities, in addition to the party obtaining or developing the targeted content (i.e., one or more of the third party, the entity and the user). In yet another non-limiting embodiment of the present disclosure, one or more of similar user behavior, qualitative and quantitative attributes stored in user profiles in one or more cluster, and user activity data is used to determine a generalized prediction of future behavior.

For example, in FIG. 5A, the first cluster including user profiles for User1, User8 and User 11 may indicate that the users corresponding to the clustered user profiles buy inexpensive items, but buy inexpensive items fairly often. The second cluster including user profiles for User3, User4, User6, User7 and User10 may indicate that users corresponding to the clustered user profiles buy inexpensive items less often. Accordingly, targeted advertisements for products costing between $100 and $150 (e.g., cameras, data-enabled mobile phones, home electronics, and car audio accessories) may be sent to the users corresponding to the user profiles included in the first cluster every three months to promote the users to maintain the frequency of their shopping, but to increase the average cost per item for the users. Targeted advertisements for products costing $100 or less (e.g., camera accessories, batteries, mainstream designer clothing and printing supplies) are sent to the users corresponding to the user profiles included in the second cluster every three months to promote the users to maintain the average cost per item, but to increase their frequency of purchasing items. In one exemplary, non-limiting embodiment of the present disclosure, User3 and User4 purchase an AT&T IPhone™, which is stored as a previous item purchased attribute in corresponding user profiles. A targeted recommendation including the AT&T IPhone™ is sent to all users (except User3 and User4) in the second cluster. The targeted recommendation may be globally accessible by all or certain specified entities, including for example, Amazon.com, Ebay.com, BestBuy.com, BensBargains.com or any retailer that sells the AT&T IPhone™. In another exemplary, non-limiting embodiment of the present disclosure, it is determined that a number of users in the second cluster have already purchased data-enabled mobile phones. Accordingly, targeted recommendations for upgrades to the purchased data-enabled mobile phones are sent when the users' contracts are ready for renewal.

In FIG. 5B, User2, User3, User4, User7, User10 and User11 all ask questions corresponding to discounts and returns. Accordingly, one may assume that the users included in the first cluster are not as interested in the details of the product and are more concerned with details of shopping with the entity. In such case, targeted answers including a website link to a return policy, an exchange policy and a discount policy for the entity are emailed to the users in the first cluster. Further, the targeted answers may be emailed to the users (and not text messaged or called) to be presented on a personal computing device (instead of a mobile device) insofar as these questions are not necessarily relevant to purchasing a particular product. In FIG. 5B, the user profiles for User1, User6 and User8 in the second cluster are analyzed to determine similar user behavior. That is, other users that spent, on average, less than $100 per item. In another exemplary non-limiting embodiment of the present disclosure, user profiles for users having similar demographic information to User1, User6 and User8 are analyzed. When User1 asks future questions and User6 and User8 ask any questions, the targeted answers will be presented in a targeted answer style preferred by the other users. For example, the other users may specify that answers are presented in a plaintext, question and answer format.

In yet another non-limiting embodiment, the similar user behavior is used to cluster the user profiles.

In FIG. 5C, user profiles corresponding to User3, User4 and User11 are analyzed to predict generalized future behavior. For example, both User4 and User11 purchased infant items and home electronics. Accordingly, it may determined that subsequent purchases for User4 and User11 may include toys and bedroom furniture appropriate for a toddler. In one non-limiting embodiment of the present disclosure, targeted recommendations for toddler toys and bedroom furniture are sent to User4 and User11 and optionally User3 after a predetermined time period has elapsed since the purchase of the infant items (e.g., one year). In another non-limiting embodiment of the present disclosure, targeted recommendations for infant items and home electronics are sent to User3.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, although the description herein references multiple individual computers, local area networks and application servers, the descriptions herein would be applicable to subsequent or equivalent systems in which multiple or even all applications are provided by one ore more application servers in a cloud environment provided by a third party. Similarly, the descriptions herein would be applicable to subsequent or equivalent systems in which individuals in an entity are distributed worldwide and each of the applications described herein is provided by one or more than one centralized application servers.

As a first example of clustering profiles, Sally Q. Public shops at Alpha Electronics Company using the Alpha Electronics Company website. In the past, Sally has purchased several cameras from Alpha Electronics Company. She currently uses her data-enabled mobile phone to search for camera1 deals. Geolocation data, which she has selected to allow Alpha Electronics to obtain and use to configure her user profile, indicates that she is in upstate New York. Because she is driving, she uses a speech-to-text conversion feature and natural language input feature to convey her input to the data-enabled mobile phone, specifically, that she wishes to locate and purchase the AX310 camera. Insofar as Sally used voice input to indicate her request, and insofar as Alpha Electronics has chosen to analyze speech to determine further qualitative attributes for the user profile, speech analysis determines that Sally currently is subject to a high level of stress, i.e., that she is irritated. Based on quantitative attributes including demographic information (e.g., Sally's age, household income and geolocation data for Sally's residence) and average dollar amount of previous purchases, and qualitative attributes including a voice level of stress and previous camera purchases, a user profile for Sally is clustered with user profiles for other users by, for example, Alpha Electronics company. The user profile for Sally is also clustered with user profiles for users that have a similar age range and household income as Sally.

User activity data for users corresponding to user profiles with which Sally's user profile was clustered only clicked only three of the five weblinks to the closest Alpha Electronics stores, insofar as the other users, having a similar level of stress in their voices, were presumably too stressed to be presented with more than three options. Targeted content for Sally is obtained and includes a screen displaying three Alpha Electronics store addresses and distances to the stores as well as an image display of the Camera Solera. Although Sally wished to purchase the Targeted content is also developed for Sally and the other users corresponding to the user profiles clustered with Sally's user profile. The targeted content includes a targeted recommendation to purchase the Camera Solera instead of the AX310 camera insofar as similar users (i.e., users having similar demographic information) and clustered users (i.e., user corresponding to user profiles with which Sally's user profile was clustered) both purchased the Camera Solera. Furthermore, the price of the Camera Solera is more consistent with Sally's the average cost of Sally's previous purchases when compared with the cost of the AX310 camera. The targeted content also includes a targeted content display, i.e., the image of the Camera Solera is presented to Sally in an zoomable image suitable for the screen size of her data-enabled mobile phone. The image of the Camera Solera is presented to Sally as a zoomable image insofar as other users with which Sally's user profile is clustered all have data-enabled mobile phones and previous purchase transaction details indicate that Sally and the other users all prefer to view items, although not necessarily purchase items, using their data-enabled mobile phones.

After driving further looking for the Alpha Electronics store(s), Sally's daughter in the care seat next to her purchases the Camera Solera online instead of waiting until Sally gets to the store. Based on this information, it may be presumed that Sally and her daughter are frustrated and additional targeted content is sent to Sally's data-enabled mobile phone. Camera accessories are presented on Sally's data-enabled mobile phone since the current nearest store only sells accessories. This time, the targeted content is presented in the form of an email because a voice analysis for Sally indicates that she is stressed and is purchasing items through her data-enabled mobile phone. The entity may want Sally to reach and enter the store to make her purchases insofar as more impulse purchases may be made in a brick-and-mortar store. The targeted content may also include sale coupons as a further incentive to shop at the nearest Alpha Electronics store.

While a computer-readable medium herein may be shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present specification describes components and functions that may be implemented in particular embodiments with reference to particular standards and protocols, the disclosure is not limited to such standards and protocols. For example, standards for power over ethernet represent an example of the state of the art. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

The invention claimed is:

1. A method comprising:
   extracting, via a tangible processor, from user activity data of users having user profiles, first coordinate values indicating quantitative attributes and second coordinate values indicating qualitative attributes, wherein the first coordinate values including a first x-axis value and a first y-axis value, and the second coordinate values including a second x-axis value and a second y-axis value, and wherein the quantitative attributes and the qualitative attributes are extracted during a specified time period determined before the user activity data is collected, wherein the quantitative attributes including a previous purchase history of the users that specifies an average time period between purchases and an average cost per item purchased, and wherein the qualitative attributes including emotions of the users and questions asked by the users;
   plotting the first coordinate values to generate a first graph, and the second coordinate values to generate a second graph;
   determining a distance along the first x-axis or the first y-axis between the plotted first coordinate values on the first graph, and a distance along the second x-axis or the second y-axis between the plotted second coordinate values on the second graph;
   contemporaneously clustering a first subset of the user profiles into a first group of users based on the distance between the plotted first coordinate values of the quantitative attributes, and a second subset of the user profiles into a second group of users based on the distance between the plotted second coordinate values of the qualitative attributes; and
   delivering a product related content to one of the first group of users or the second group of users based on the clustering, the product related content rendered according to display requirements for a user device,
   wherein the first group of users is clustered based only on the quantitative attributes, and
   wherein the second group of users is clustered based only on the qualitative attributes.

2. The method of claim 1,
   wherein one or more of the first subset or the second subset of the user profiles are dynamic user profiles.

3. The method of claim 1,
   wherein one or more of the first subset or the second subset of the user profiles are static user profiles.

4. The method of claim 1,
   wherein the user activity data includes details of purchasing items via an entity.

5. The method of claim 1, further comprising:
   extracting, from the user activity data, speech characteristics based on speech analysis.

6. The method of claim 5,
   wherein the emotions of the users are determined based on the speech characteristics.

7. The method of claim 5, further comprising:
   storing demographic information as one of the quantitative attributes, the demographic information being obtained from the speech analysis, in the user profiles.

8. The method of claim 1, further comprising:
   extracting, from the user activity data, geolocation data for at least one user as one of the quantitative attributes.

9. The method of claim 8,
wherein the clustering is further based on the geolocation data.

10. The method of claim 1, further comprising:
extracting, from the user activity data, other user activity data corresponding to similar users.

11. The method of claim 10,
wherein the clustering is further based on the other user activity data corresponding to the similar users.

12. The method of claim 10,
wherein the similar users are determined to be similar based on demographic information as one of the quantitative attributes for the users stored in the user profiles.

13. The method of claim 1,
wherein the product related content is globally accessible by a plurality of entities.

14. The method of claim 1,
wherein a user profile is actively configured by a corresponding user.

15. The method of claim 1, further comprising:
determining a generalized prediction of future user activity based on the clustering and a user profile.

16. The method of claim 1, further comprising:
determining a preferred website for a user, based on the user activity data.

17. The method of claim 1, further comprising:
storing the quantitative attributes and the qualitative attributes in the user profiles for the users.

18. The method of claim 1, wherein the product related content is an advertisement.

19. A system comprising:
a memory that stores executable instructions; and
a processor that executes the executable instructions,
wherein, when executed by the processor, the executable instructions cause the system to perform operations comprising:
extracting from user activity data of users having user profiles, first coordinate values indicating quantitative attributes and second coordinate values indicating qualitative attributes, wherein the first coordinate values including a first x-axis value and a first y-axis value, and the second coordinate values including a second x-axis value and a second y-axis value, and wherein the quantitative attributes and the qualitative attributes are extracted during a specified time period determined before the user activity data is collected, wherein the quantitative attributes including a previous purchase history of the users that specifies an average time period between purchases and an average cost per item purchased, and wherein the qualitative attributes including emotions of the users and questions asked by the users;
plotting the first coordinate values to generate a first graph, and the second coordinate values to generate a second graph;
determining a distance along the first x-axis or the first y-axis between the plotted first coordinate values on the first graph, and a distance along the second x-axis or the second y-axis between the plotted second coordinate values on the second graph;
contemporaneously clustering a first subset of the user profiles into a first group of users based on the distance between the plotted first coordinate values of the quantitative attributes, and a second subset of the user profiles into a second group of users based on the distance between the plotted second coordinate values of the qualitative attributes; and
delivering a product related content to one of the first group of users or the second group of users based on clustering of the user profiles, the product related content rendered according to display requirements for a user device,
wherein the first group of users is clustered based only on the quantitative attributes, and
wherein the second group of users is clustered based only on the qualitative attributes.

20. A non-transitory computer readable storage medium that stores a set of executable instructions that, when executed, direct a processor to perform operations comprising:
extracting from user activity data of users having user profiles, first coordinate values indicating quantitative attributes and second coordinate values indicating qualitative attributes, wherein the first coordinate values including a first x-axis value and a first y-axis value, and the second coordinate values including a second x-axis value and a second y-axis value, and wherein the quantitative attributes and the qualitative attributes are extracted during a specified time period determined before the user activity data is collected, wherein the quantitative attributes including a previous purchase history of the users that specifies an average time period between purchases and an average cost per item purchased, and wherein the qualitative attributes including emotions of the users and questions asked by the users;
plotting the first coordinate values to generate a first graph, and the second coordinate values to generate a second graph;
determining a distance along the first x-axis or the first y-axis between the plotted first coordinate values on the first graph, and a distance along the second x-axis or the second y-axis between the plotted second coordinate values on the second graph;
contemporaneously clustering a first subset of the user profiles into a first group of users based on the distance between the plotted first coordinate values of the quantitative attributes, and a second subset of the user profiles into a second group of users based on the distance between the plotted second coordinate values of the qualitative attributes; and
delivering a product related content to one of the first group of users or the second group of users based on the clustering, the product related content rendered according to display requirements for a user device,
wherein the first group of users is clustered based only on the quantitative attributes, and
wherein the second group of users is clustered based only on the qualitative attributes.

* * * * *